Jan. 13, 1925.                                                    1,522,778
E. F. HATHAWAY ET AL
MECHANISM FOR PLACING TUFT YARNS IN CARPET MANUFACTURE
Filed May 9, 1923          10 Sheets-Sheet 2
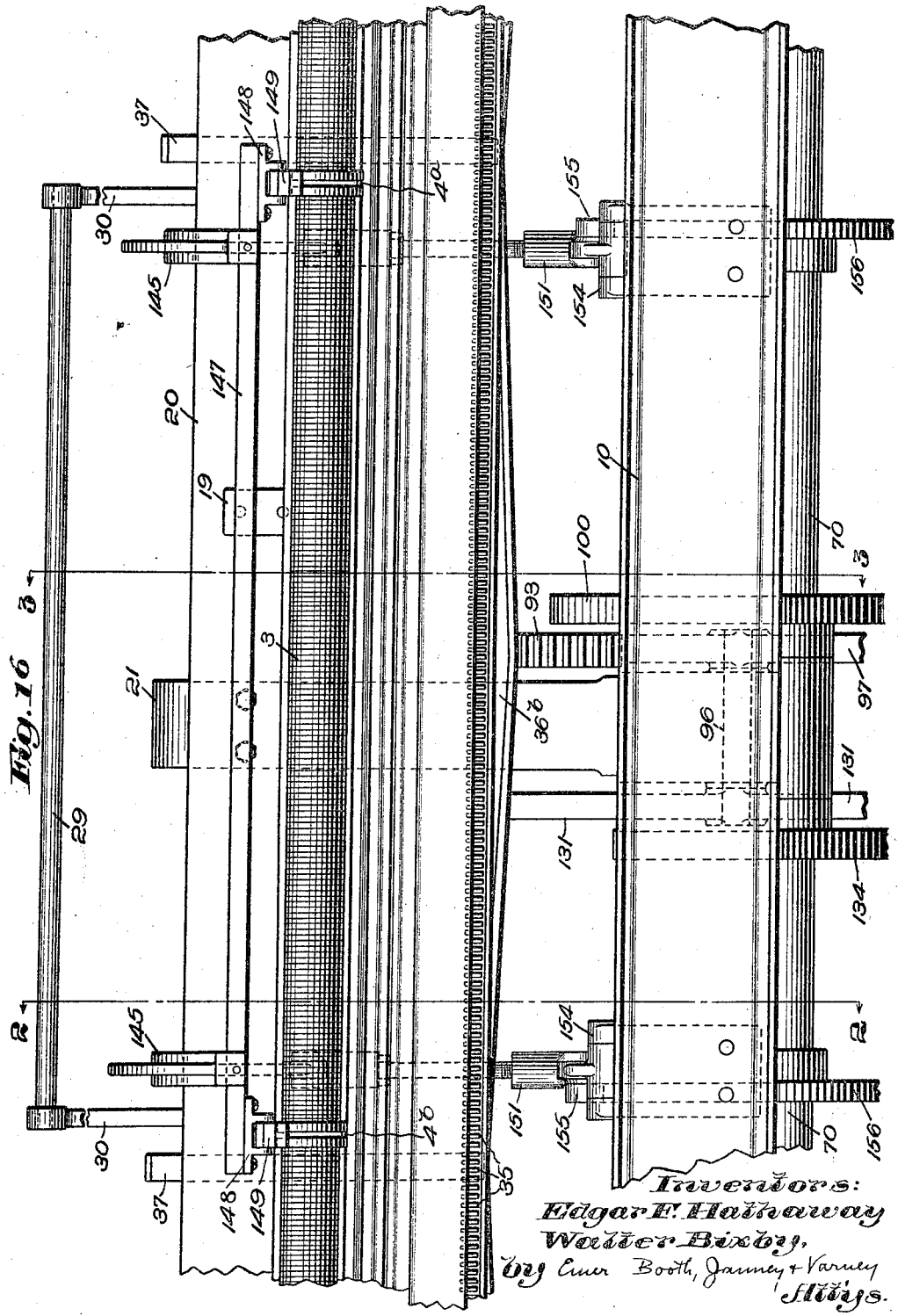
Inventors:
Edgar F. Hathaway
Walter Bixby,
by Emer Booth, Janney + Varney
Attys.

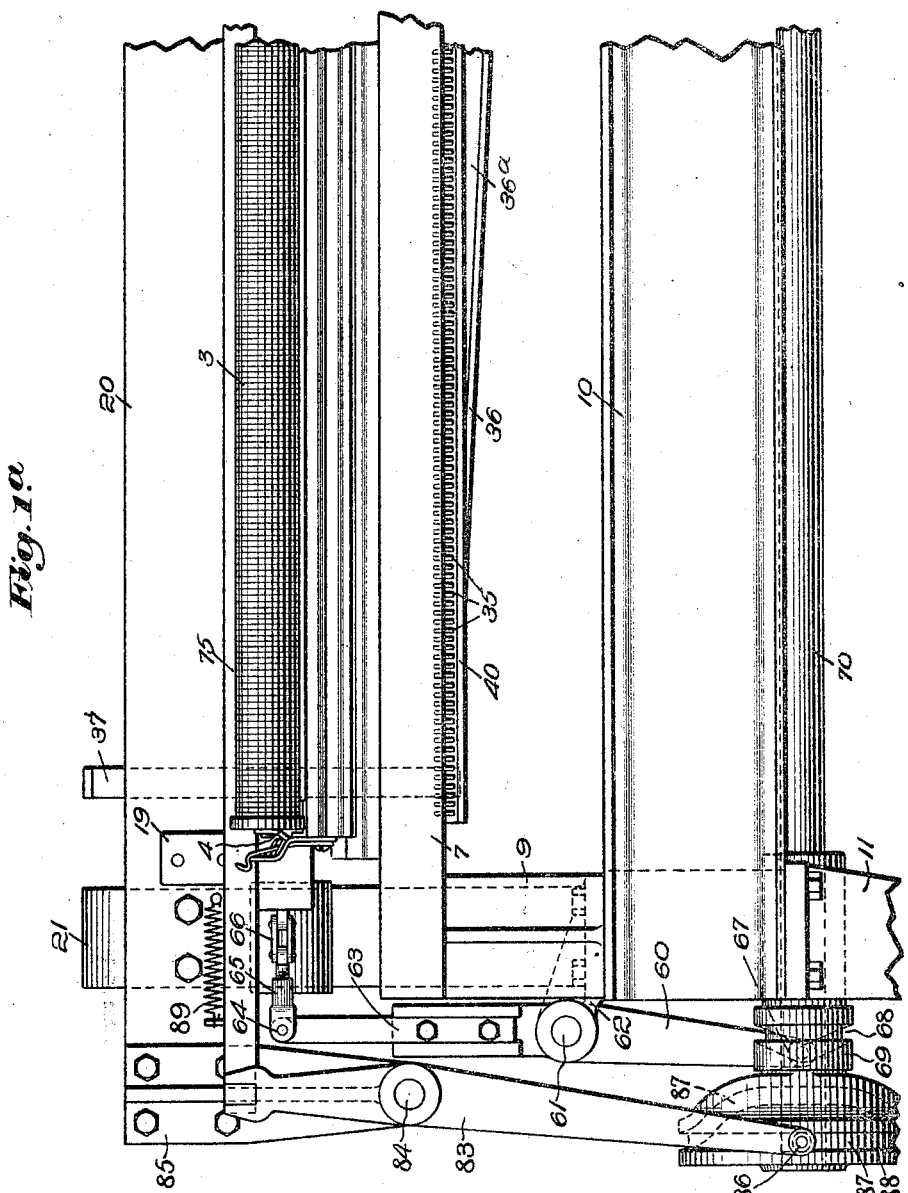

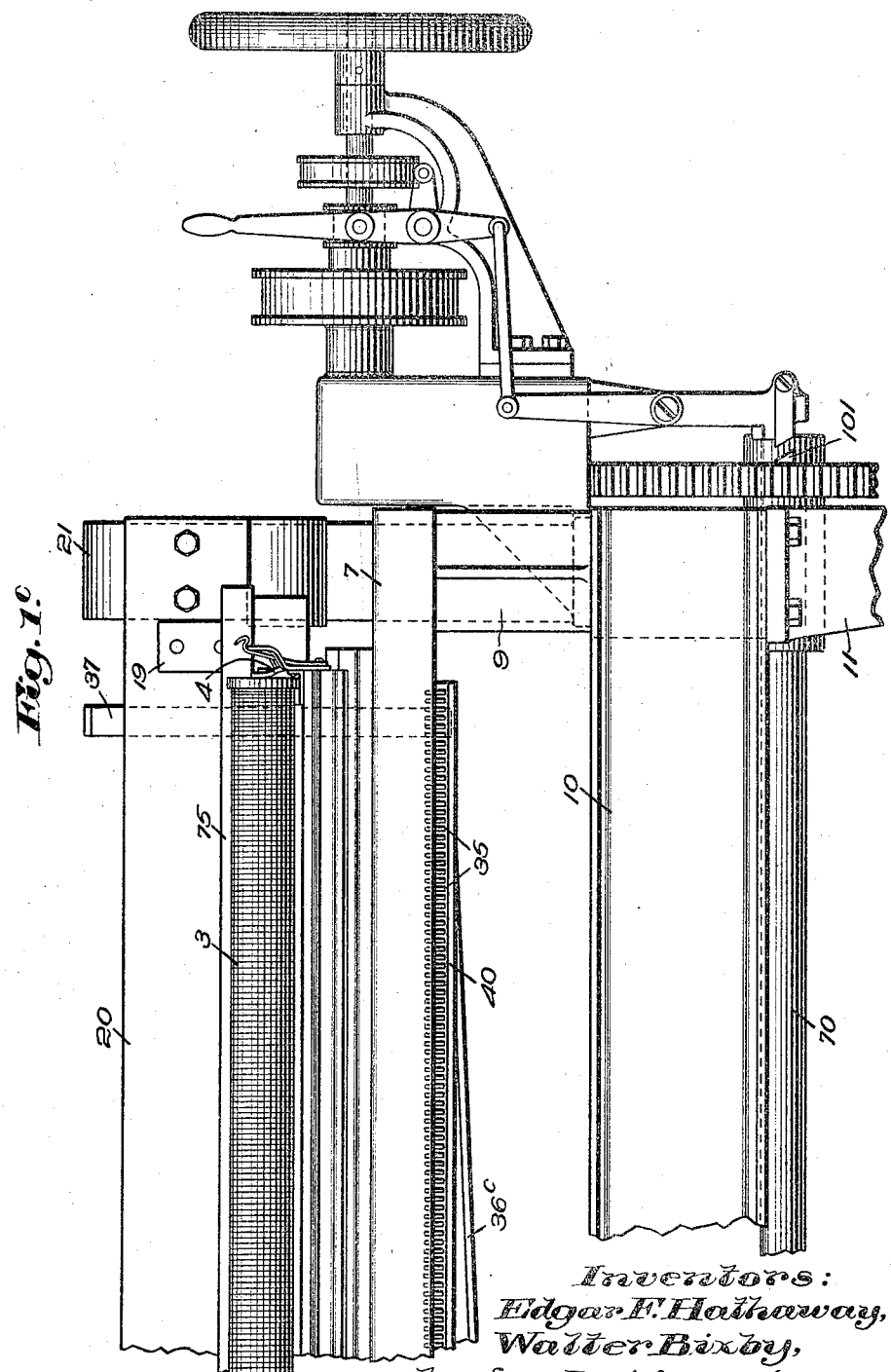

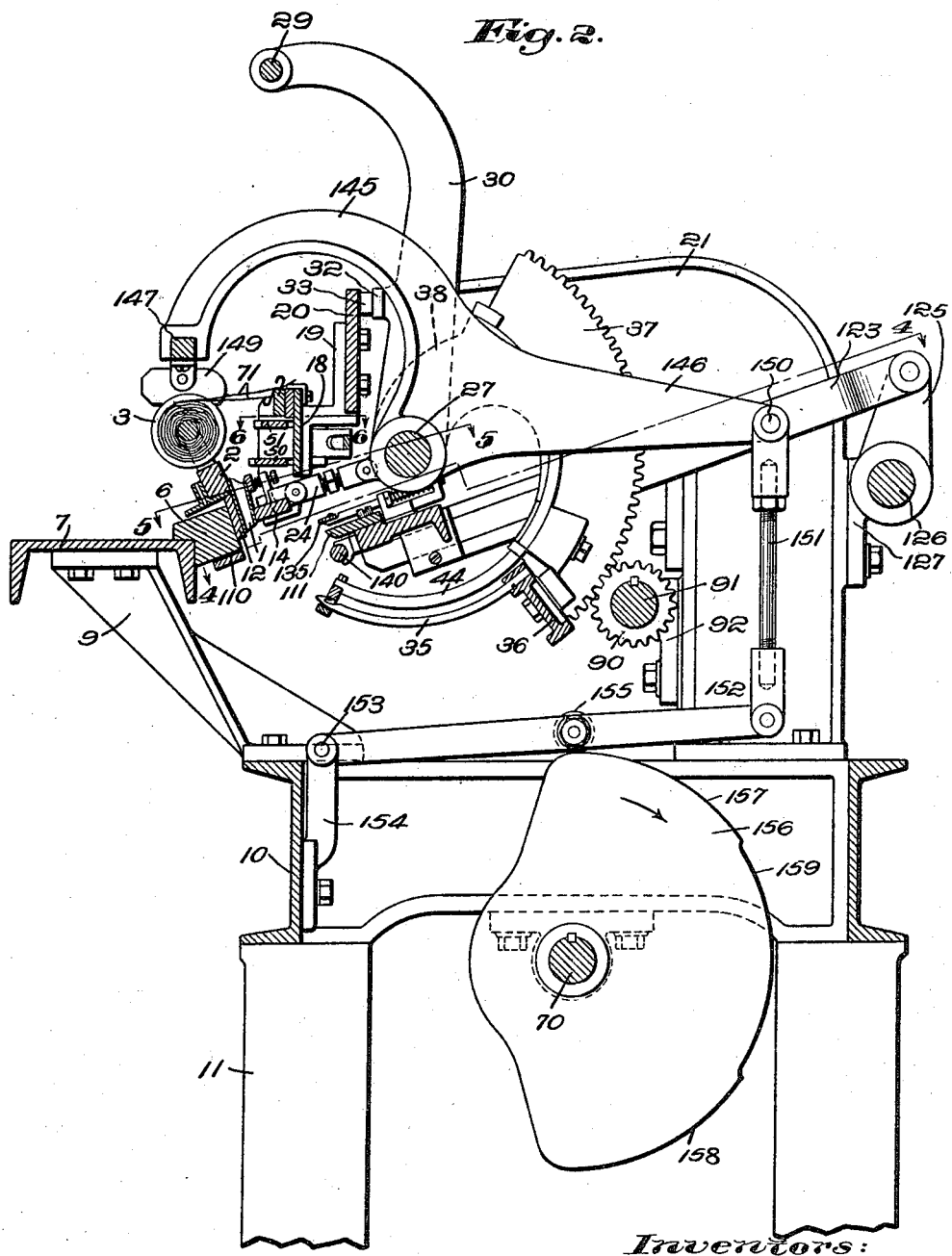

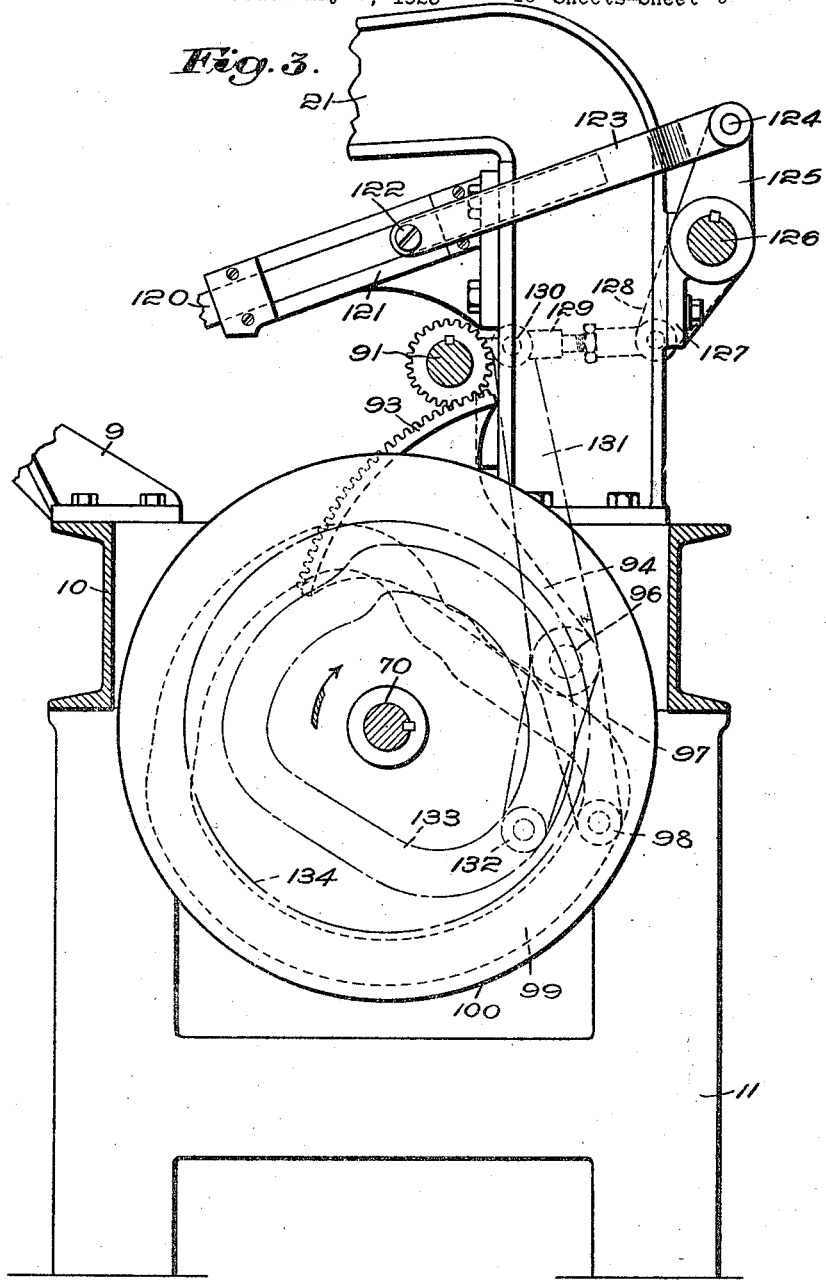

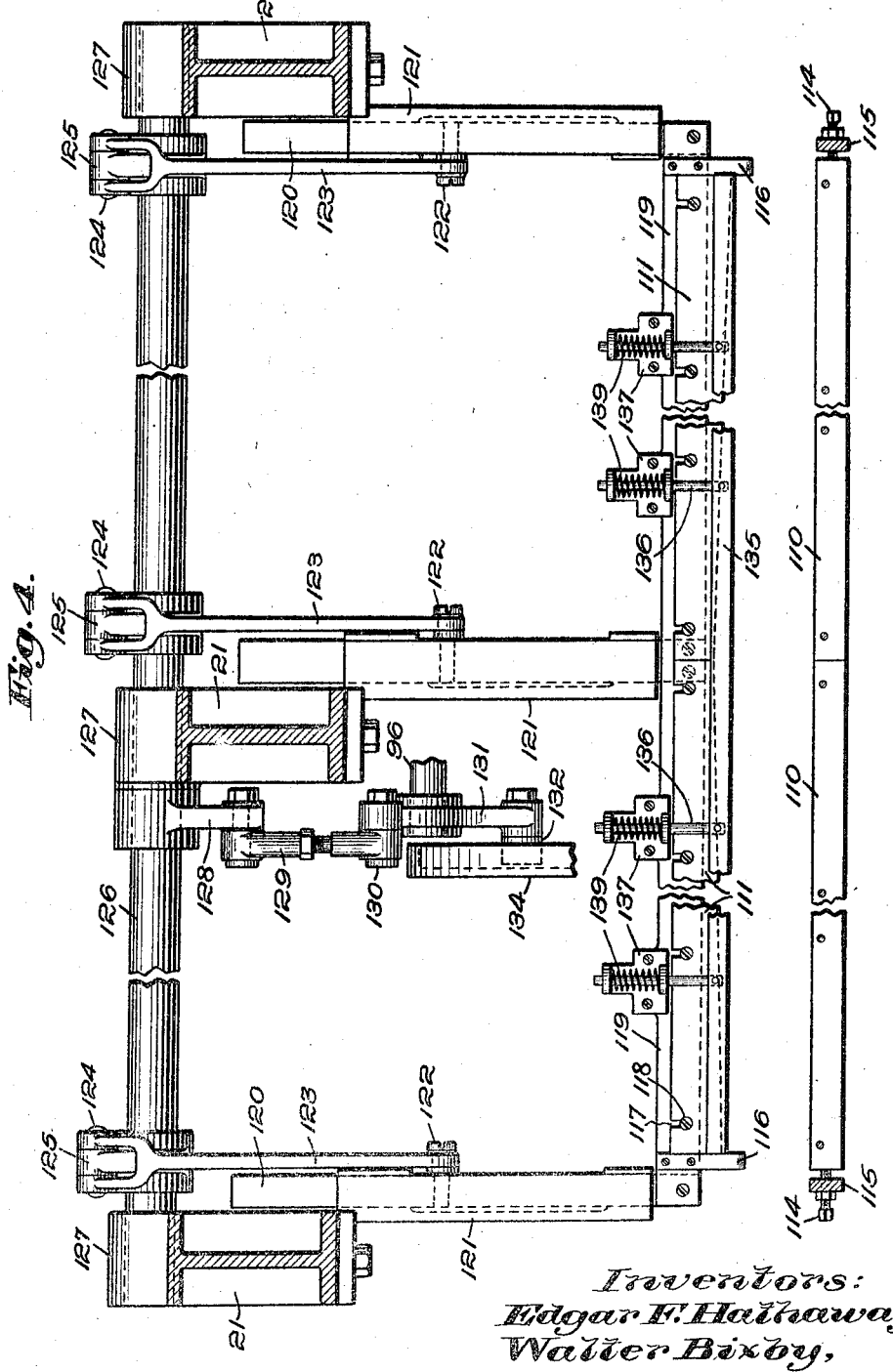

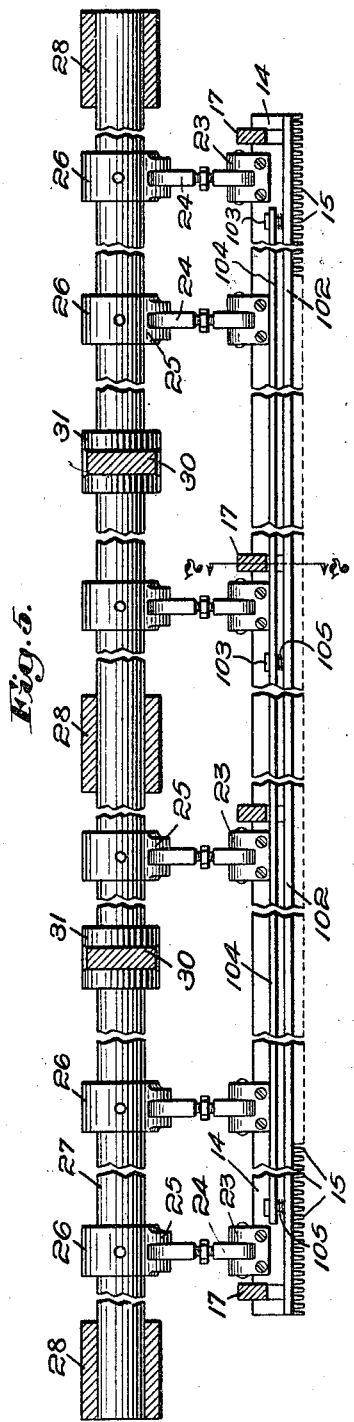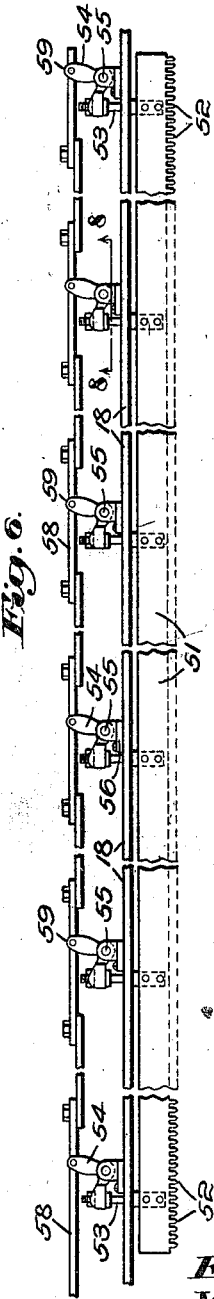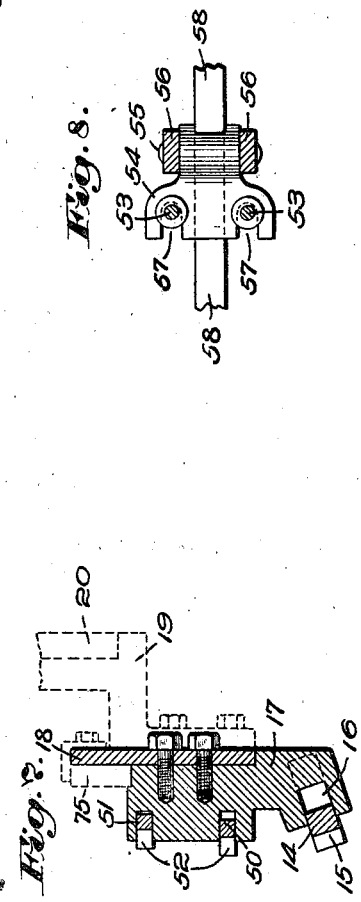

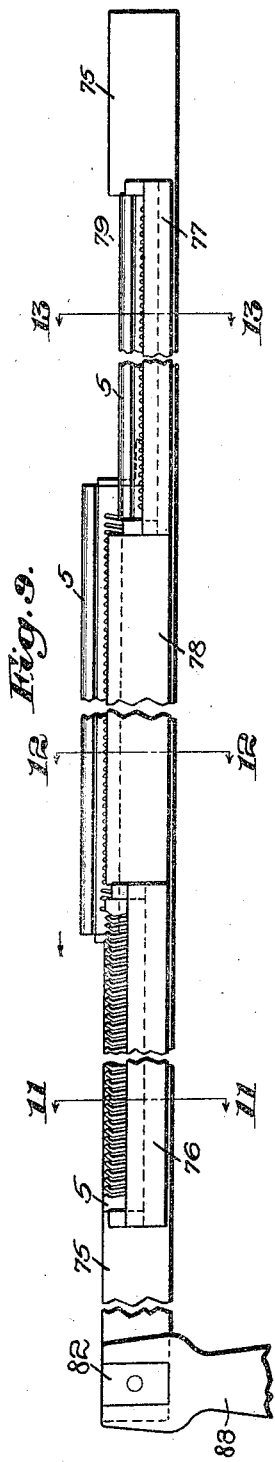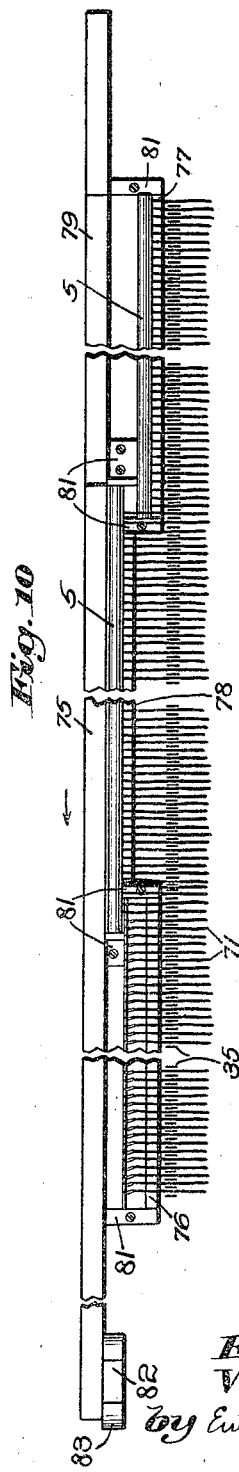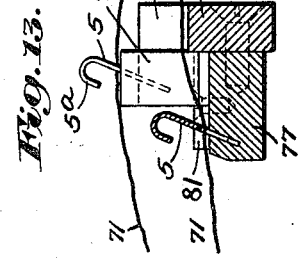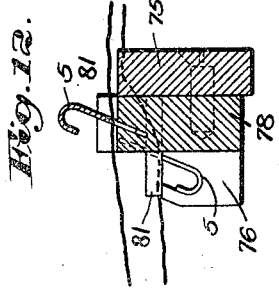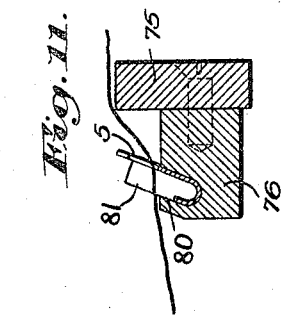

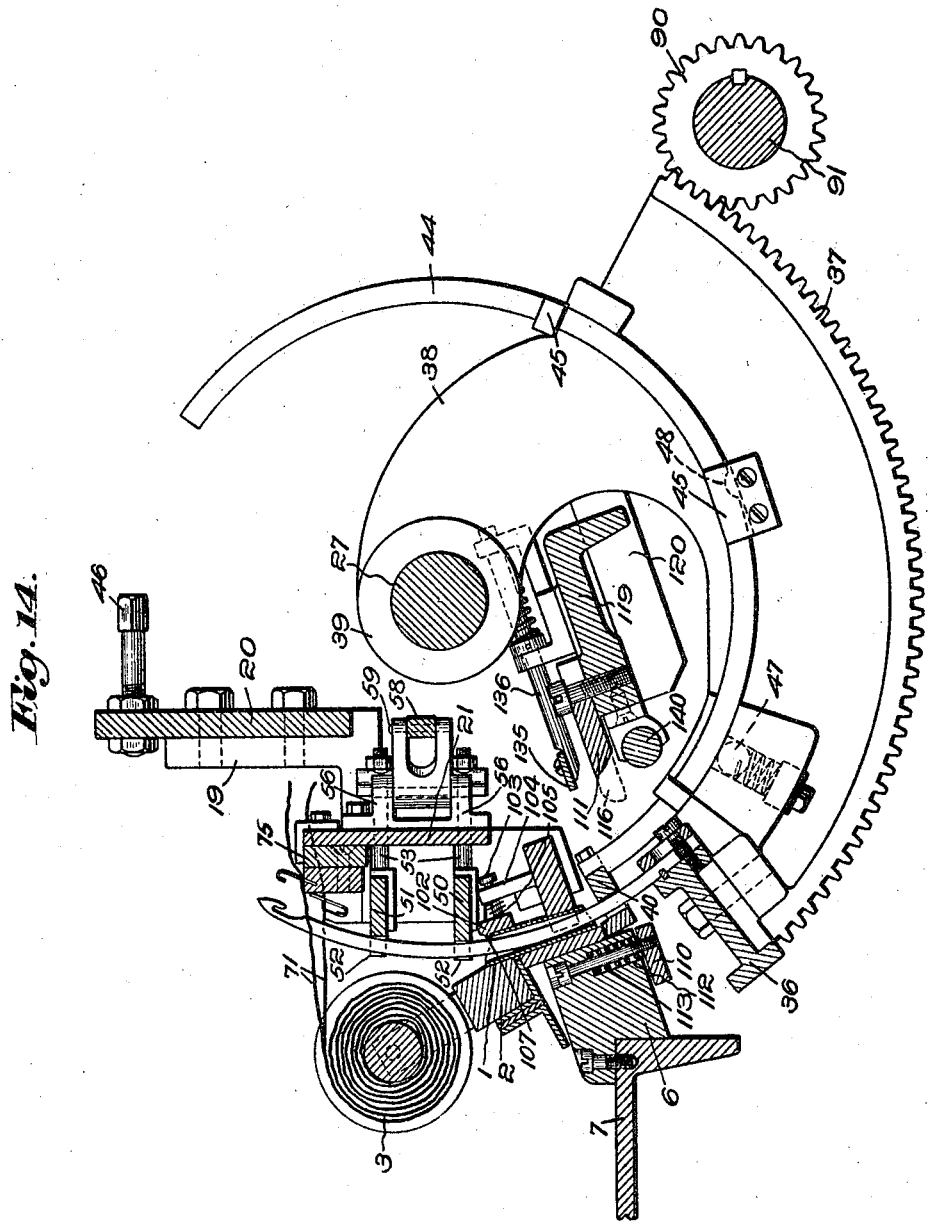

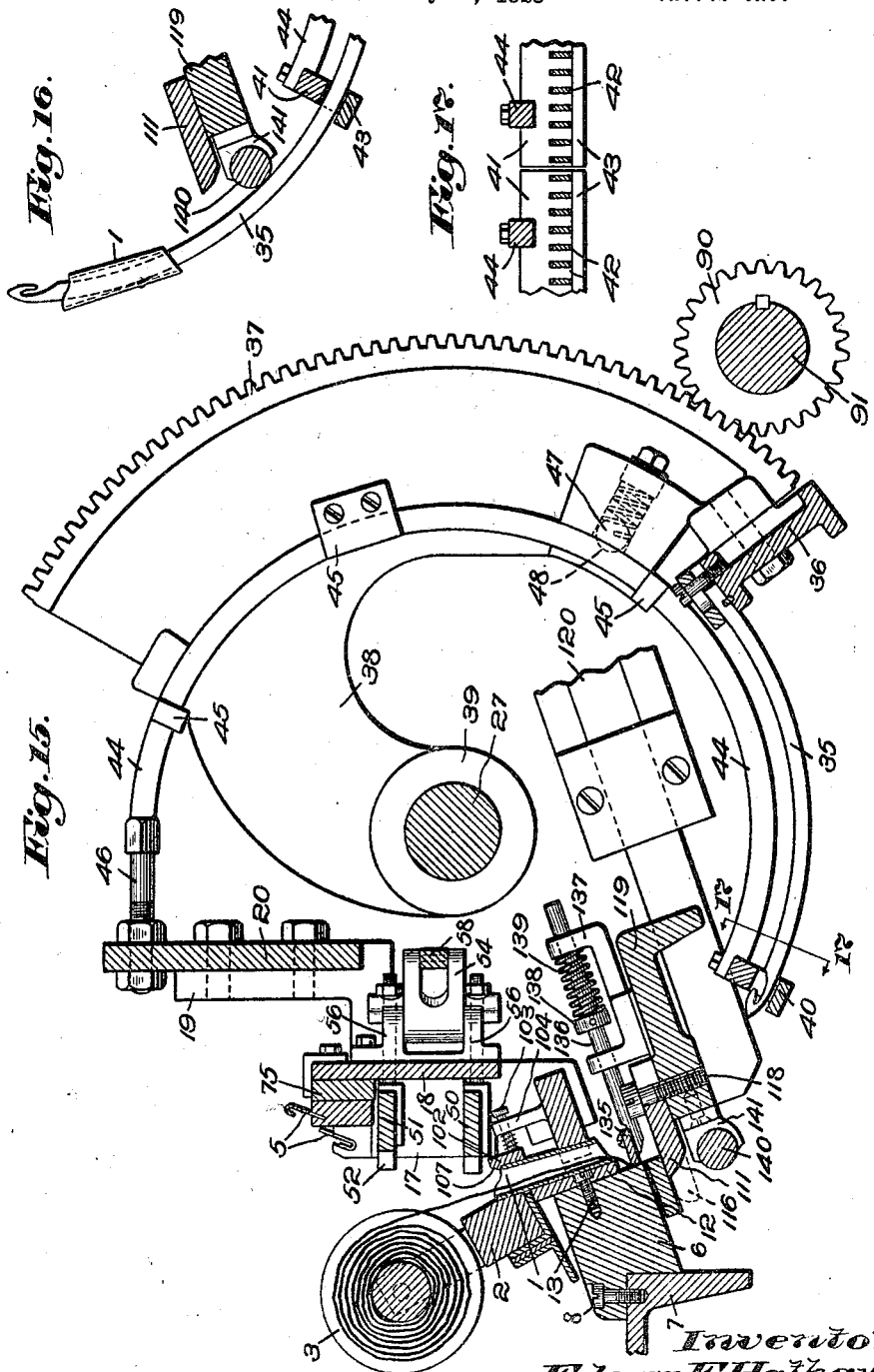

Patented Jan. 13, 1925.

1,522,778

UNITED STATES PATENT OFFICE.

EDGAR F. HATHAWAY, OF WELLESLEY, AND WALTER BIXBY, OF DORCHESTER, MASSACHUSETTS, ASSIGNORS TO SHAWMUT ENGINEERING COMPANY, OF DORCHESTER, MASSACHUSETTS, A CORPORATION OF MASSACHUSETTS.

MECHANISM FOR PLACING TUFT YARNS IN CARPET MANUFACTURE.

Application filed May 9, 1923. Serial No. 637,652.

*To all whom it may concern:*

Be it known that we, EDGAR F. HATHAWAY and WALTER BIXBY, citizens of the United States, and residents, respectively, of Wellesley, in the county of Norfolk, and Dorchester, in the county of Suffolk, State of Massachusetts, have invented an Improvement in Mechanisms for Placing Tuft Yarns in Carpet Manufacture, of which the following description, in connection with the accompanying drawings, is a specification, like characters on the drawings representing like parts.

This invention relates to machines for placing tuft yarns in carpet manufacture through the tubes or the like of a tube frame or other carrier such as employed in the manufacture of Axminster or similar carpets or rugs. It applies more particularly to what is known as "wide work" where the carpet or rug is woven in a single width, the carrier or tube frame being of a corresponding length.

In performing wide work an extra long tube frame is customarily employed in conjunction with two, three, or more spools of common or ordinary length, the latter being serially arranged in suitable supports attached to the tube frame so that after the yarns are threaded through the tubes the spools remain upon the tube frame in the same relation and serve in effect as a single spool from which the yarns are fed simultaneously through the tubes when in the loom.

Heretofore in the case of a tube frame used for wide work and especially where such tube frame is supplied with yarns from a series of individual spools, it has been necessary, so far as we are aware, to perform the tubing operation in a succession of operations, usually one or more threading operations for each spool. For example, in the case of a tube frame requiring three spools of ordinary length arranged in a series the threading of the yarns has always been performed by first threading the yarns of one spool through one section of tubes, then shifting the tube frame and threading the yarns of the next spool, then again shifting the tube frame and finally threading the yarns of the third spool. In such case it was also necessary to provide special spool holders upon the tubing machine in which each spool was first positioned and after being there threaded was removed and placed in its supports upon the tube frame.

In the form of invention herein disclosed, however, there is provided a tubing machine of such length as to handle simultaneously the yarns of all spools upon a tube frame of the maximum length used for wide work. The spools are each mounted directly upon said tube frame for the threading operation, and the tubing machine carries a sufficient number of threading devices simultaneously to thread the yarns from all the spools in a single operation. That is to say, the tubing machine is supplied with as many of such devices as there are tubes in a tube frame of maximum length, each tube, eye, or like device adapted to receive one yarn or a set or group of yarns if two or more are to be employed as a unit in the weaving operation. Spool holders upon the tubing machine itself may thus be dispensed with since the spools are preferably held at all times during the threading operation directly upon the tube frame. After threading, the spools remain upon the tube frame which is then taken directly to the loom.

The invention will be best understood by reference to the following description when taken in connection with the accompanying illustration of one specific embodiment thereof while its scope will be more particularly pointed out in the accompanying claims.

In the drawings Fig. 1ᵃ is a front elevation of the left hand end of the tubing machine;

Fig. 1ᵇ is a similar view of the central or intermediate portion of the tubing machine;

Fig. 1ᶜ is a front elevation of the right hand end of said machine;

Fig. 2 is a vertical section upon the line 2—2 of Fig. 1ᵇ looking in the direction of the arrows;

Fig. 3 is a similar section upon the line 3—3 of Fig. 1ᵇ parts being broken away;

Figs. 4, 5 and 6 are transverse sections taken respectively upon the lines 4—4, 5—5 and 6—6 of Fig. 2 and looking downwardly in the direction of the arrows;

Fig. 7 is a detail section upon the line 7—7 of Fig. 5;

Fig. 8 is a section upon the line 8—8 of Fig. 6;

Fig. 9 is a front elevation showing the transfer combs in position in the comb holder;

Fig. 10 is a plan view of the same;

Figs. 11, 12 and 13 are vertical sections taken respectively upon the lines 11—11, 12—12, 13—13 of Fig. 9;

Figs. 14 and 15 are views partially in end elevation and partially in vertical section showing the needle mechanism and associated parts in two different positions thereof.

Fig. 16 is a detail view partially in section and partially in end elevation of a needle guide roll;

Fig. 17 is a section upon the line 17—17 of Fig. 15.

Referring to the drawings and particularly to Figs. 1, 2, 14 and 15 we have shown a yarn carrier having devices such as tubes, eyes, or the like for receiving and maintaining separate a series of yarn ends or groups of yarn ends. Herein said carrier is illustrated as a tube frame intended for wide work. This comprises the metallic tubes 1 supported on the tube bar or holder 2, the tubes being arranged to project downwardly from said holder at an angle slightly less than a right angle. In the present instance the tube frame is shown as of a length to receive three common spools 3 of ordinary length. The outer ends of the end spools are rotatably supported in the spring clips 4 at each end of the tube frame. The inner ends of said spools, together with the intermediate spool are supported in intermediate journalled brackets 4ª, 4ᵇ, two of which are provided in the present construction, one of them being fixed and the other, herein 4ᵇ, being yieldingly slidable longitudinally of the tube frame to permit the intermediate spool to be inserted or removed. Desirably the spools when resting in their journals have their adjacent heads interlocked so that they may be turned as a unit as in the patent to Charles Lea 1,213,216, dated January 23, 1917.

The yarns are wound upon each spool preparatory to the tubing operation by means of a set frame or spooling machine and are held separated at their ends by means of a transfer or aligning comb 5 (Fig. 9) in the manner, for example, as described in the patent to Hathaway and Lea 1,153,865 dated September 14, 1915. The transfer combs may be secured to the face of their respective spools by means of suitable spring fasteners which engage the projecting pintles of the spools and the end of the comb. In this condition the spools may be stored in quantity and used at the tubing machine as desired.

Referring now to the tubing machine itself and more particularly to the means for supporting the tube frame, the latter is carried upon a tube frame support herein comprising a substantially rectangular bar or support 6 extending the full length of the machine. Said supporting bar is provided with a longitudinal recess of V-shape in cross section forming a seat for the bar upon the inner edge of a horizontal shelf 7 also extending across the machine from end to end. The bar or support 6 thus projects inwardly and upwardly at an angle from said shelf to which it is secured in any suitable manner, as by screws 8 (Fig. 15). Said shelf 7 is itself supported upon brackets 9 extending upwardly and forwardly at an angle from the base 10 of the tubing machine which rests upon any suitable foundation, such as the table 11.

Extending along the inner surface of said bar 6 is a longitudinal supporting member 12 fixed thereto as by screws 13 (see Fig. 15) with its upper edge projecting slightly above the bar. The flat upper and inner surfaces of said member 12 form the direct supporting means for the tube frame 2. The tubes 1 are thus supported in position slightly inclined from the vertical with the openings of the tubes lying in the path of travel of the needles.

The tubes and tube frame are held fixedly positioned in the tubing machine during the threading operation by a releasable clamping mechanism. Herein for the purpose there is provided a tube frame clamp comprising a clamping bar 14 extending the entire length of the tube frame and grooved or notched upon its outer or forward edge to form teeth as indicated at 15 (see particularly Fig. 5). Said clamping bar 14 is supported for sliding movement toward and away from the tube frame in guide slots 16 formed in the lower portion of bearing members 17 the rear edge of the bar being provided with recesses cooperating with said slots to permit the bar to move rearwardly the desired distance, as indicated by dotted lines in Fig. 7.

Said bearing members 17 are secured, as by bolts, at suitable intervals along a cross support 18 carried by brackets 19, a plurality of which, herein three, are distributed along the tubing machine. Said brackets 19 are secured to the front face of a horizontal longitudinal frame member or cross bar 20 which is carried upon the outer ends of the overhanging portions of the upright frame members 21 of the machine. In the present instance three of said upright frame members 21 are provided, one at each end of the base 10 of the machine and one approximately midway longitudinally thereof. Said cross bar 20, together with the upright frame members 21, base 10 and shelf 7 constitutes the main support or framing for the various operating parts of the machine.

For moving said tube clamping bar 14 there are provided along the rear edge thereof a plurality of pairs of ears 23, (see Fig. 5) each adapted pivotally to receive one end of one of the adjustable toggle levers 24. The other ends of said toggle levers are pivotally supported between spaced lugs 25 formed upon collars 26 fixed upon the horizontal shaft 27, the latter being supported in suitable bearings 28 in the frame members 21. Said shaft 27 is adapted to be rocked by means of a hand bar 29 (see Figs. 1$^b$ and 2) supported in spaced operating levers 30 having hubs 31 for fixedly attaching the same to the shaft 27. The forward swinging movement of said operating levers is limited by suitable stops 32 upon the forward portion of said levers which in the forward or clamping position of the tube clamping mechanism, as shown in Fig. 2, abut the fixed stops 33 carried upon the rear surface of the transverse girder 20 thus preventing crushing of the tubes.

After placing the tube frame in position upon the support 12 the attendant firmly clamps the same by downward pull upon the hand bar 29 thus rocking the shaft 27 in a contraclockwise direction, as viewed in Fig. 2, causing the toggle levers 24 to straighten and move the clamping bar 14 forwardly. The teeth 15 of said clamping bar enter the spaces between adjacent tubes firmly and exactly to position the same in the desired relation to the needles. In the clamping position shown in Fig. 2 the toggle levers have passed just over the dead centers thereof in which position they therefore remain until the hand bar is moved backwardly by the attendant when it is desired to remove the tube frame after the threading operation.

Referring now more particularly to the thread placing mechanism, as best seen in Figs. 2, 14 and 15 the thread placing devices or needles 35 in the present form of invention are not straight members as heretofore but are curved or arcuate in shape. As clearly appears in Figs. 1$^a$, 1$^b$, and 1$^c$, sufficient of said needles 35 are provided to extend the entire length of the tube frame, there being one needle for every tube upon said frame, which herein supports three ordinary spools.

The arcuate needles 35 are fixedly supported at their rear ends in the needle holding bar 36 also extending substantially the entire length of the tubing machine and preferably formed of a plurality of adjoining parts, as indicated at 36$^a$, 36$^b$ and 36$^c$ in Figs. 1$^a$, 1$^b$ and 1$^c$ respectively. Said needle holding bar 36 is carried upon one end of a plurality of arc-shaped racks 37 of which there are four in the present instance, said racks 37 being themselves supported by means of curved arms 38 having hubs 39 at their outer end loosely received upon said shaft 27 before mentioned. Said arcuate needle racks 37 are thus supported for swinging or rocking movement about said shaft 27 and are prevented from moving longitudinally of the shaft by any suitable means such as collars, not shown. The needles therefore receive a pivotal or swinging movement about said shaft as a center.

To assist in guiding the needles 35 at the forward ends thereof during that portion of their movement prior to entering the tubes and while retreating from the same, there is provided the lower needle guide bar 40. Said guide bar 40 extends throughout the length of the bank of needles and because of the extraordinary length of said needle bank is desirably formed in a plurality of aligned sections, as clearly indicated in Fig. 17. Each section of said needle guide is preferably formed in two parts, namely an upper member 41, in the lower edge of which the slots 42 for guiding the needles are milled out, and a lower member 43 is secured to the lower edge of said upper member to close the slots.

The needle guide bar 40 is supported for sliding movement relatively to the needles 35 by means of the semi-circular slides or supports 44 one of which is provided for each arcuate rack 37. Said supports 44 are themselves slidably carried by said arc-shaped needle racks 37 in suitable guides 45 provided at spaced intervals therealong.

In the normal or rearward position of the needles 35, as seen in Fig. 15, said needle guide 40 and its supporting slides 44 are also in their rearmost position with the inner end of said slides 44 abutting adjustable stops 46 projecting rearwardly from the cross bar 20. When the needles begin their forward movement the needle guide bar 40 moves forwardly with the needles due to the frictional engagement between them and between the slides and their guides 45. Desirably said frictional action is augmented by the provision of ball detents 47 which are adapted to seat in notches 48 in the slides 44 in the rearward position of the same.

The needles and needle guide 40 thus move forwardly together substantially to the position in which the needles enter the lower and smaller end of the tubes 1. The forward surface of the needle guide then brings up against the bottom surface of the supporting member 12 upon the tube frame support 6, which acts as a stop. The needle guide is thus prevented from further movement, while the needles continue their forward movement with their supporting racks, and relatively to the guide 40. Upon retraction, the needles and the guide first move rearwardly together until the rear ends of the slides 44 bring up against their respective stops 46, preventing their further movement. The needles continue their rearward movement, moving now relatively to said slides until they have again reached the position shown in Fig. 15 and in which the spring-pressed ball detents 47 snap into their corresponding notches 48.

By means of the lower needle guide 40 above described the needles are supported and guided at their forward ends until they enter the tubes, the entry of the needles into the proper tubes thus being assured. It is also desirable to guide and align the needles after they have emerged from the larger or upper end of the tubes 1 and before they pass through between the yarns. For so guiding and aligning the needles we have here provided a pair of slidable upper needle guides or bars 50 and 51. Each of said guide bars 50 and 51 is notched or grooved at its forward edge to provide teeth 52 adapted to pass into the spaces between the adjacent needles.

The means for supporting said upper needle guides 50 and 51 and the method of moving the same is best seen in detail in Figs. 6, 7 and 8, taken in connection with Figs. 14 and 15. As clearly shown in Fig. 7, said needle guides are each supported for sliding movement in horizontal slots formed in the bearing member 17 which also supports the tube clamping bar 14. Said guides 50 and 51 are substantially duplicates with the exception that the lower guide 50 when moved outwardly extends forwardly slightly further than the upper guide 51 in order properly to cross the circular path of the needles, as apparent in Fig. 14.

Spaced along the rear edge of each of said guides 50 and 51 are a plurality of pairs of slide rods 53 supported for sliding movement in the cross support 18. Said slide rods are adapted to be reciprocated by means of the bell crank levers 54 which are pivotally supported at 55 between spaced lugs 56 projecting rearwardly from said cross supports 18. The inner ends of each of said bell crank levers are formed with a pair of vertically spaced notches 57 which receive the inner ends of said slide rods 53 the latter being each provided with a fixed collar and an adjustable nut which receive the levers 54 between them. The outer ends of said bell crank levers are forked to receive the horizontal operating bar 58 to which they are pivoted at 59. Said operating bar 58 extends the entire length of the tubing machine and is preferably formed of a plurality of parts adjustably interconnected at their ends as by means of slot and bolt connection, indicated in Fig. 6.

Movement of the operating bar 58 in a direction longitudinally thereof will thus rock the bell crank levers 54 upon their pivots 55 causing them to reciprocate the slide rods 53 to which are attached the needle guides 50 and 51, the movement being so timed that said guides are moved outwardly just as the tips of the needles pass above the upper guide 51 and before the needles have reached the yarns and are again withdrawn as or shortly after the needles begin to retract.

For operating said bar 58 any suitable mechanism may be provided. Herein (see Fig. 1$^a$) there is employed a cam lever 60 supported for rocking movement upon a horizontal stud shaft 61 supported in suitable bearings formed in a bracket 62 secured to the base of the tubing machine at the left end thereof. At its upper end said cam lever is provided with an adjustable arm 63 to the outer end of which is pivotally connected at 64 a link 65 itself connected through an adjustable link 66 with the left end of said operating bar 58. At its lower extremity said cam lever 60 carries a cam roll 67 which cooperates with a cam groove 68 cut in the cam 69 fixed upon the main drive shaft 70 adjacent the left end thereof. As said cam 69 is rotated the cam lever 60 is rocked thereby reciprocating the operating bar 58 to move the needle guides 50 and 51.

It is thus apparent that the needles are guided and properly aligned at all times during their movement until they pass upwardly through the yarns indicated at 71 in Figs. 2 and 14, first by the lower guide 40, then by the tubes, and then by the upper guides 50 and 51.

As before stated, the yarns of each spool are held separated by transfer or aligning combs 5. Said combs are supported in the tubing machine during the threading operation in a slidable comb holder 75. Referring particularly to Figs. 9 to 13 it will be noted that said comb holder is of a length to extend from end to end of the tubing machine and is adapted to receive simultaneously three combs 5, one for each spool. Each comb consists of an elongated sheet metal member having barbed teeth along one edge and having the opposite edge turned over, as indicated for example at 5$^a$ in Fig. 13.

In order to cause the various colored yarns to lie in the proper order and as called for by the rug pattern it is necessary that the combs at the opposite ends of the tubing machine shall be supported in reverse positions relatively to each other. Herein the comb holder 75 is constructed to receive the right hand end comb when inserted teeth foremost while the comb at the left end of the holder is received with turned over end foremost, the intermediate comb in the present instance also being inserted teeth foremost. It will also be noted that in order to bring the yarns in proper position throughout the entire length of the machine the combs must overlap, as clearly shown in Figs. 9 and 10 in which the combs are shown so positioned that the right hand end yarn of the left hand comb is spaced the same distance from the left hand end of the intermediate comb as the distance between the teeth of the combs. The same is also true of the left end of the right hand comb and the right end of the intermediate comb.

For thus supporting and positioning the combs the comb holder 75 is provided at its forward surface with an elongated projecting shelf of irregular shape, the left end portion 76 of said shelf and the right end portion 77 projecting forwardly substantially equal distances as is clear in the plan view in 10. The intermediate portion 78 of said shelf, extends outwardly a less distance. The three portions 76, 77 and 78 of said shelf also have their upper surfaces at different levels, the intermediate portion 78 being the highest, the left end portion 76 the next in height and the right end portion 77 being the shortest. The comb holder itself has a cut out portion 79 opposite the right end comb. In this manner the yarns of the three separate combs are caused to lie in substantially horizontal position, so that the needles moving substantially vertically upwardly may pass between and engage with the yarns at approximately right angles with relation thereto.

The left end portion 76 (see Fig. 11) is formed with a relatively wide groove 80 cut at an incline in which is received a comb 5 with its turned-over end down as shown in Fig. 11. The right end portion 77, best seen in Fig. 13, and the intermediate portion 78 (Figs. 12 and 13) are each formed with narrow inclined slots in which the combs are received and supported with the teeth foremost. Properly to align the combs in the positions shown in the figures and so that the needles will pass between the proper yarns each portion 76, 77 and 78 of said shelf upon the comb holder 75 is provided with a pair of stops, one at each end thereof and between which the combs are inserted, three pairs of said stops being clearly indicated in Fig. 10 at 81, 81, etc.

When the needles have passed upwardly between the strands of yarn the comb holder carrying the combs is shifted transversely of the machine to cause the yarns to be laid into the bights of the needles. Said shifting movement may be effected by any suitable mechanism. Herein for this purpose the comb holder 75 is supported for longitudinal sliding movement upon the upper surfaces of the brackets 17 (see Fig. 7) and is provided at its left end, as viewed in Figs. 1ª and 9 with a pivoted block 82 received in the forked upper extremity of a comb shifting lever 83 pivotally supported intermediate its ends, as at 84, upon a depending bracket 85 carried at the left end of the cross bar 20. The lower end of said comb shifting lever carries a cam roll 86 which operates with a cam path 87 cut in a cam 88 fixed upon the left extremity of the main drive shaft 70 beyond the needle guide cam 69.

When said cam 88 is rotated the comb shifting lever 83 is rocked at the proper time to shift the comb holder together with the combs 5 supported therein thereby to lay the yarns across the needles which at this time occupy substantially the position shown in Fig. 14. A spring 89 (Fig. 1ª) attached at its opposite ends to the cross bar 20 and the comb holder 75 respectively may be provided to take up any lost motion and to assist in shifting said holder.

The needles 35 are caused to advance and retract along a semi-circular or arcuate path in which path the tubes 1 are positioned. This rotary reciprocating movement is imparted to the needles by any suitable mechanism. Herein each arcuate needle rack 37 meshes with a pinion 90 keyed upon a countershaft 91 supported in suitable bearings in brackets 92 (see Fig. 2) secured to the upright frame members 21.

As best seen in Figs. 3 and 1ᵇ, said countershaft 91 is rocked by means of a gear segment 93 carried by an arm 94 supported for rocking movement upon a stationary stud shaft 96 supported in the intermediate upright frame member 21 (see Fig. 1ᵇ). Integral with or fixed to said arm 94 is a downwardly projecting cam lever 97 carrying at its lower end the needle cam roll 98 which is received in a cam path 99 indicated by dotted lines in Fig. 3 and cut in the face of the needle cam 100 which appears in full lines in said figure. Said needle cam is keyed upon the main drive shaft 70. Power being applied to said drive shaft the needles are caused to advance and retract along an arcuate path, the needle cam 100 being so shaped as to cause a complete reciprocatory movement of the entire bank of needles for one revolution of the cam.

Power may be applied at will to the main drive shaft 70 by the operator through the mechanism shown in Fig. 1ᶜ which is of the well-known expansion clutch and pulley type, substantially similar to that fully described in said patent to Hathaway and Lea 1,153,865. An automatic stop 101 is provided upon one of the operating gears and which is adapted to cooperate with lever mechanism automatically to stop the tubing machine after each complete reciprocation of the bank of needles and prior to the subsequent tubing operation.

Referring again particularly to Figs. 2, 5, 14 and 15, we have provided mechanism whereby the eyes of the needles are prevented from hooking over the edges of the tubes during their retracting movement. For this purpose there is provided a needle guide bar or cam 102 which is preferably carried upon the upper surface of the tube frame clamp 14 and extends substantially the entire length thereof. Said guide bar 102 is supported for sliding movement relatively to the tube frame clamp as by means of studs 103 projecting rearwardly from said guide bar and slidingly supported in suitable brackets 104 fixed upon the upper surface of the tube frame clamp 14. Springs 105 surrounding the studs 103 tend to hold the guide bar in forward position. As best seen in Figs. 14 and 15 said guide bar 102 is provided near its upper end with a projecting lip having a beveled upper surface 107.

When the tube frame clamp 14 is moved forwardly by means of the handle bar 29 to clamp the tube frame in position the needle guide bar 102 is moved therewith and yieldingly engages the upper ends of the tubes 1 with its lip overhanging the upper edge of said tubes. Further movement of the frame clamp only compresses the springs 105. The beveled or cam surface 107 of the guide bar thus lies in position to cause any needle whose outer end projects too far rearwardly to be cammed or wedged slightly forwardly and prevents its eye from hooking the edge of the tube as the needle passes downwardly through the same.

Prior to use in the loom it is necessary that the drawn-in yarn ends shall all project evenly and with certainty to the required distance from the ends of the tubes. In practice, therefore, it is desirable to trim the yarn ends and we have herein provided trimming or shearing means together with means for holding the yarn ends whereby said trimming or shearing is automatically accomplished in the same operation with the tubing or drawing-in of the yarns.

Accordingly we have shown a stationary but yieldable knife blade 110 and a movable knife blade 111 (see particularly Figs. 2, 4, 14 and 15). Said stationary blade 110 is carried upon the under surface of the tube frame support 5 being supported for yielding movement toward and away from the same by a plurality of spaced bolts 112 (see Fig. 14) slidably received in said tube frame support 5. Springs 113 surround each bolt, being seated within suitable recesses in the tube frame support and tend to press the stationary knife 110 downwardly and out of contact with the lower surface of the tube frame support, as seen in said Fig. 14, so that said stationary knife projects slightly into the path of the movable blade 111.

Desirably said knife 110 because of the extreme length of the machine is formed of two or more sections, as indicated in Fig. 4. Means is also provided accurately to adjust said knife longitudinally and to press the several sections thereof into close contact, said means herein comprising set screws 114 at each end of the knife and adjustably supported in lugs 115 depending at each end of the tube frame support. The movable knife blade 111 also desirably, and for similar reasons, is formed of a plurality of parts.

The forward cutting edge of said movable knife preferably is not straight but slightly concave, being inclined from each end inwardly toward the center, as indicated by dotted lines in Fig. 4. Due to this construction the shearing does not take place simultaneously across the entire width of the machine but occurs progressively from each side inwardly toward the center. The shearing effect between the two knives is further increased because of the resilient support for the stationary knife. The knife 111 is provided at each end with a forwardly projecting cam member 116, one of which is shown in dotted lines in Fig. 15. Said cams engage the under surface of the stationary knife 110 and raise the same out of the path of the blade 111 just prior to the beginning of the shearing operation thus compressing the springs 113. Said springs press knife 110 against the movable knife as it passes, thus increasing the shear-like operation of the blades and causing a clean trimming of the yarn ends.

The movable knife blade 111 has cut in its rear edge a plurality of slots 117 receiving screws 118 for adjustably securing said knife upon the knife bar 119. Said knife bar is carried at the forward ends of a plurality of knife slides 120 themselves slidably supported in suitable guides formed in brackets 121 (see Fig. 3) secured upon and projecting from the upright frame members 21. For reciprocating the knife slides 120 any suitable mechanism may be employed. As shown herein, there is pivotally attached at 122 to each of said slides an operating link 123 having a forked outer extremity in which is pivotally attached as at 124 one end of levers 125 fixed upon a rock shaft 126 supported in bearings formed in brackets 127 upon the rear surface of the upright frame members 21.

For rocking said shaft 126, and as best seen in Figs. 3 and 4, there is fixed thereon, adjacent the intermediate bracket 127, an arm 128 the outer or lower end of which is pivotally secured to an adjustable link 129 itself pivoted at 130 to the upper end of a double armed knife cam lever 131. Said knife cam lever is pivotally supported intermediate its ends upon the same stud shaft 96 which supports the needle cam lever. The lower end of said knife cam lever is disposed at an angle to the upper end thereof and carries a knife cam roll 132 which cooperates with a knife cam path 133 shown in dot-and-dash lines in Fig. 3 and formed in one side face of the knife cam 134 (also indicated by dot-and-dash lines) fixed upon the main drive shaft 70. The cam 131 is so formed and timed that the movable knife 111 is projected forwardly to cooperate with the stationary knife 110 to shear the yarns after the needles have been withdrawn therefrom.

Desirably the ends of the yarn strands are held or clamped slightly before and during the shearing operation. Accordingly we have provided a clamp for the yarn ends, seen in detail in Fig. 4 and also in Figs. 2, 14 and 15. Said yarn clamp herein comprises a bar 135 extending substantially the entire length of the tube frame and preferably having an inner rounded surface. Said clamping bar 135 is carried upon the knife bar 119 and travels therewith but is also supported for yielding movement relative thereto.

For this purpose said yarn clamp is carried by means of a plurality of rearwardly extending rods 136 slidably supported in yokes 137 themselves secured upon said knife bar. Each of said rods 136 is provided with a collar 138 on that portion of the rod which lies intermediate the ends of the yoke members 137. A coil spring 139 surrounds each of the rods 136, bearing at its outer end against the said collar 138 and at its opposite end against the inner arm of the yoke member 137. The springs thus tend to maintain the clamping bar 135 in forward position, the collars 138 serving also as stops to limit the forward motion of the same.

As the knife bar travels forwardly said yarn end clamp also moves forwardly and just prior to the engagement of the knife blades in commencing the shearing action said yarn clamp engages all the yarn ends just above the stationary knife and clamps the same securely against the inner surface of the tube frame support 5 as clearly seen in Fig. 15. Further forward movement of the knife bar during the shearing tends merely to compress the springs 139.

In practice it has been found that needles of the arcuate shape here employed, to secure compactness of structure and for other purposes, occasionally have a tendency to straighten during their retracting movement. This tendency may be due to the pull of the yarns upon the needles and to the engagement of the needles within the tubes and is of its maximum effect when the needles are substantially in the position indicated in Fig. 16. To overcome this tendency we have provided means for maintaining the needles in their proper curved positions.

For this purpose, in the construction shown, there is secured upon the front surface of the knife bar 119 an elongated presser roll or needle guide roll 140. Said presser roll is of sufficient length to extend across the entire bank of needles and if desired may be formed of a plurality of adjoining sections. A bearing 141 secured as by screws to said knife bar rotatably supports said roll. It will be noted that said needle presser roll projects forwardly somewhat beyond the edge of the knife blade 111 and contacts with the needles when the outer ends thereof are about to pass downwardly within the tubes during the drawing-in operation and in the position shown in Fig. 16. The roller exerts a slight pressure against the needles at a point intermediate their ends thereby tending to increase the curvature thereof and to prevent the outer hooked ends of the needles from straightening out.

At certain times during the threading operation it is necessary that the spools of yarn be held against rotation while at other times it is desirable that said spools be free to rotate in order to permit the yarn to unwind or to provide some slack in the yarn. Accordingly we have provided spool holding mechanism which is best seen in Figs. 1$^b$ and 2.

Said mechanism includes a pair of yoke-shaped members 145 each having a rearwardly projecting arm 146. Said yokes 145 are loosely supported upon the same shaft 27 which supports the needle mechanism, one yoke being positioned adjacent each end of the central or intermediate spool. The yokes are interconnected at their forward ends by the brake bar 147 (see Fig. 1$^b$). At each end of said brake bar is carried a bracket 148 having spaced depending lugs between which is pivotally supported a brake shoe 149. Said brake shoes are so positioned and are of such width as to engage the adjacent heads of two spools which when the shoes are in braking position are thus prevented from rotating.

Any suitable mechanism may be provided for moving the spool brake into or out of holding position at the desired intervals. Herein each of the arms 146 projecting rearwardly from the yoke-shaped brake supports pivotally carries at its outer end, as at 150, an adjustable link connection 151, the latter being pivotally secured to one end of the appropriate brake cam lever 152, the opposite ends of which have a pivotal support at 153 upon brackets 154 secured to the base 10 of the tubing machine.

Each of the brake cam levers 152 carries at a point intermediate its ends a brake cam roll 155 which rides upon the outer surface of the brake cams 156 which are fixed upon the main drive shaft 70 upon opposite sides of the centrally positioned knife cam and needle operating cam.

When the cam roll 155 rests upon those portions of the brake cam 156 which are of less radius the arm 146 is allowed to drop with the consequent raising of the brake shoes and the releasing of the spools to permit them to rotate. During the greater part of the travel of the needles the brake is not applied. The raised portions 157 and 158 of the cam are preferably so formed and positioned that the brake is applied just before the needles pass upwardly through the yarn strands and so remains until the needles have started to retract and have drawn the yarn ends out of the transfer combs. The depressed portion 159 of the cam then becomes operative to release the brake and to permit the yarns to unwind from the spools while the needles are passing downwardly through the tubes. Shortly after the needles have withdrawn from the tubes the other raised portion of the cam becomes effective to apply the brake thus holding the spools and causing the yarn ends to remain stationary while the needles continue to retract and are freed from the yarns. Thereafter the shearing and yarn clamping operation occurs. The movements above described obviously may be varied to suit different conditions.

Having thus described our invention we desire it to be understood that the invention is not limited to the particular illustrative embodiment disclosed herein, the scope thereof being set forth in the following claims.

Claims:

1. In a machine for threading tuft yarns through the tubes of a tube frame in carpet manufacture, said tube frame having means for holding thereon, in serial arrangement, a plurality of spools of ordinary length, the combination with means for holding the yarns of all said spools, a series or bank of needles, and means for simultaneously engaging the yarns of all said spools by the needles.

2. In a machine for placing tuft yarns in a yarn carrier for use in carpet manufacture the combination of means upon the machine for supporting a carrier adapted to receive the yarns of a plurality of spools of ordinary length, said carrier having means for supporting serially a plurality of said spools, means on the machine for holding the yarns of all said spools, a threading device for each yarn unit, and means for moving said devices to place all the yarn units in said carrier while the spools are supported thereon and in a single position of said carrier.

3. In a machine for placing tuft yarns in carpet manufacture the combination with a carrier having yarn receiving devices, sufficient in number to receive the yarns of a plurality of spools of ordinary length and having means for supporting said plurality of spools, a support upon the machine for said carrier, yarn holding means, a series or bank of reciprocable needles, one for each yarn receiving device of the carrier, and means to reciprocate said needles to thread all said yarn receiving devices of the carrier while the spools are in their supported position thereon.

4. In a machine for tubing tuft yarns in carpet manufacture the combination with a tube frame, the latter being adapted to hold serially a plurality of spools, means along the machine for supporting said frame, means on the machine for holding the yarn of said plurality of spools, a bank of needles at least equaling in number the number of yarns of said spools, and means for simultaneously engaging all the yarns by the needles whereby all the tubes of said frame may be threaded in a single position of the latter.

5. In a machine for threading tuft yarns through the tubes of a tube frame in carpet manufacture, said tube frame having means for holding thereon in serial arrangement a plurality of spools of ordinary length, the combination with means for holding the yarns of all said spools in spaced relation, a series or bank of needles at least equal in number to the number of all the yarns, and means for advancing and retracting said needles simultaneously to thread all said yarns.

6. Mechanism for tubing tuft yarns in carpet manufacture comprising in combination, a tube frame having means for rotatably supporting thereon a plurality of serially arranged spools of ordinary length, a comb for each spool for maintaining the yarns thereof in spaced relation, and means for holding said combs in position opposite their respective spools.

7. Mechanism for tubing tuft yarns in carpet manufacture comprising in combination a tube frame for use in wide work, a series of spools of ordinary length, rotatably supported thereon, an aligning comb for the yarns of each spool, and a comb holder adapted to receive said combs in longitudinal serial arrangement with the ends of adjacent combs slightly overlapping whereby the yarns of all the spools are maintained in equally spaced relation throughout the length of the tube frame.

8. Mechanism for tubing tuft yarns in carpet manufacture comprising in combination a tube frame for use in wide work, a series of spools of ordinary length, rotatably supported thereon an aligning comb for the yarns of each spool, and a comb holder adapted to receive said combs in longitudinal serial arrangement with the ends of adjacent combs slightly overlapping whereby the yarns of all the spools are maintained in equally spaced relation throughout the length of the tube frame and with at least one comb reversed with respect to the remaining combs.

9. In a machine for tubing tuft yarns in carpet manufacture in combination, a tube frame for use in wide work, a series of spools supported thereon for rotation as a unit, a support upon the machine for said frame, a bank of needles extending from end to end of the machine, means for maintaining the yarns of all the spools in spaced relation, and mechanism for moving said needles simultaneously to thread the yarns of all the spools through the tubes of the tube frame.

10. In a machine for tubing tuft yarns in carpet manufacture, in combination, a plurality of curved needles supported for swinging movement about their center of curvature, means upon the machine for supporting a tube frame with its tubes lying in the path of movement of said needles, and mechanism for swinging said needles to advance and retract them through the tubes to engage and draw in the yarns.

11. In a machine for tubing tuft yarns in carpet manufacture, in combination, a plurality of parallel, curved needles, a needle bar to which one end of each of said needles is fixed, a plurality of curved racks for supporting said needle bar, and means for reciprocating said racks thereby to advance and retract said needles along the line of their curvature.

12. In a machine for tubing tuft yarns in carpet manufacture, in combination, a plurality of curved needles, a needle bar supporting said needles and mounted for swinging movement about the center of curvature thereof and mechanism including a rack and gearing for swinging said needle bar.

13. In a machine for tubing tuft yarns in carpet manufacture the combination of means upon the machine for supporting a tube frame adapted to hold serially a plurality of spools and having a tube for each yarn of said spools, a series or bank of curved needles, and means for moving said needles simultaneously to thread all the tubes of the frame with said spools in position thereon.

14. In a machine for tubing tuft yarns in carpet manufacture the combination with a tube frame adapted to hold serially a plurality of spools and having a tube for each yarn of said spools, means along the machine for supporting said frame, a needle bar having a plurality of arcuate needles, one for each tube, and means for advancing and retracting said bar simultaneously to thread all of said tubes with said spools in position upon the frame.

15. In a machine for tubing tuft yarns in carpet manufacture the combination with a tube frame adapted to hold serially a plurality of spools and having a tube for each yarn of said spools, a support upon the machine for said frame, said machine being at least equal in length to the length of the frame, a series or bank of reciprocable curved needles, one for each tube and means to impart a movement of rotary reciprocation to said needles to thread all the tubes in a single operation whereby successive positioning of the frame is obviated.

16. In a machine for threading tuft yarns through the tubes of a tube frame in carpet manufacture said tube frame having means for holding thereon in serial arrangement a plurality of spools of ordinary length the combination with means for holding the yarns of all said spools, a series or bank of arcuate needles, and means for simultaneously engaging the yarns of all said spools by the arcuate needles.

17. In a machine for threading tuft yarns through the tubes of a tube frame, in carpet manufacture, said tube frame having means for holding thereon in serial arrangement a plurality of spools of ordinary length, the combination with means for holding the yarns of all said spools in spaced relation, a series or bank of curved needles at least equalling in number the number of all the yarns, a pivotal support for said needles, and means to move said needles simultaneously to thread all the yarns.

18. The method of placing tuft yarns through the tubes of an extra wide frame adapted to be equipped with a plurality of spools which consists in first installing the spools upon the frame, then aligning the yarns from all the spools with relation to the respective tubes throughout the entire length of the frame, and finally in simultaneously placing the yarns from all the spools each through its proper tube in a single operation.

19. In a machine for tubing tuft yarns in carpet manufacture, in combination, a plurality of curved needles, a needle bar supporting said needles and mounted for swinging movement about the center of curvature thereof, means for moving said bar and needles, and a tube frame having its tubes lying in the path of the needles, and means for guiding the ends of the needles to assure their entry into the proper tubes.

20. In a machine for tubing tuft yarns in carpet manufacture, in combination, a plurality of curved needles, a needle bar supporting said needles and mounted for swinging movement about the center of curvature thereof, means for moving said bar and needles, a tube frame having its tubes lying in the path of the needles, and a guide adjacent the outer ends of the needles to insure their entry into the proper tubes, said guide moving with the needles during the first part of their advancing movement but held stationary during the remainder of said movement.

21. In a machine for tubing tuft yarns in carpet manufacture, in combination, a plurality of curved needles, a needle bar supporting said needles and mounted for swinging movement about the center of curvature thereof, means for moving said bar and needles, a tube frame having its tubes lying in the path of the needles, a guide bar adjacent the outer ends of the needles, slides for supporting said guide bar to permit it to move relatively to the needles, said guide bar and needles moving together during the first portion of both the advancing and retracting movement of the needles but having relative motion during the remaining portions of said movements.

22. Mechanism for tubing tuft yarns in carpet manufacture comprising in combination means for holding the tubes, a plurality of curved needles, means for advancing and retracting the latter relatively to the tubes, a member with which the needles are slidably engaged for guiding the needles into the tubes, and means for positively engaging and guiding the needles when they emerge beyond the tubes.

23. Mechanism for tubing tuft yarns in carpet manufacture comprising in combination means for holding the tubes, a plurality of curved needles, means for passing the needles through the tubes and a plurality of guiding members for positively engaging and guiding the needles at spaced points along their path when they emerge beyond the tubes.

24. In a machine for threading tuft yarns, the combination with tube holding means, a plurality of curved needles, means for advancing and retracting them through the tubes, means for holding the yarns, a plurality of movable guiding members spaced longitudinally of the needles between the yarns and the tubes, and mechanism for moving said members positively to engage and guide the needles when they emerge beyond the tubes.

25. In a machine for threading tuft yarns, the combination with tube holding means, a plurality of curved needles, means for advancing and retracting them through the tubes, means for holding the yarns, a plurality of movable guiding members spaced longitudinally of the needles between the yarns and the tubes, and mechanism for moving said members positively to engage and guide the needles when they emerge beyond the tubes, and to withdraw said members as the needles retract.

26. In a machine for threading tuft yarns, the combination with tube holding means and means for supporting the yarn ends, a plurality of curved needles, means for advancing and retracting them through the tubes to seize and draw in the yarns, and means periodically to engage the needles intermediate their ends to maintain the curvature thereof.

27. In a machine for threading tuft yarns, the combination with tube holding means and means for supporting the yarn ends, a plurality of curved needles, means for advancing and retracting them through the tubes to seize and draw in the yarns, movable means for shearing the drawn-in yarn ends, and a presser roll movable with said shearing means periodically to engage the needles intermediate their ends.

28. In a machine for threading tuft yarns, the combination with tube holding means, a plurality of curved needles, means for advancing and retracting them through the tubes, and means engageable with said needles to cause their outer ends to clear the edges of the tubes when the needles are retracted.

29. In a machine for threading tuft yarns, the combination with tube holding means, a plurality of curved needles, means for advancing and retracting them through the tubes, and cam means adjacent the outer ends of the tubes to cause any needles which may be out of alignment therewith to clear the tubes during their retracting movement.

30. In a machine for threading tuft yarns, the combination with a tube holding frame, clamping mechanism for positioning said frame upon the machine, a plurality of curved needles advanceable and retractable through the tubes, and means carried by said clamping mechanism to engage any disaligned needle to clear it from its tube during the retracting movement.

31. In a machine for threading tuft yarns, the combination with a row of tubes upon a tube frame, a clamp for holding said tubes and frame in functioning position upon the machine, a plurality of curved needles advanceable and retractable through said tubes, and yieldable means carried by said clamp and adapted to overlie the outer edge of the tubes to clear the needles therefrom during their retracting movement.

32. In a machine for threading tuft yarns, the combination with tube holding means, a plurality of curved needles, means for advancing and retracting them through the tubes, a guide for the needles as they advance to the tubes, a guiding member or members for aligning the needles when they emerge beyond the tubes, and means engageable with any disaligned needle to cause it to clear the tubes when retracting.

33. In a machine for threading tuft yarns, the combination with tube holding means, a plurality of curved needles, means for advancing and retracting them through the tubes, a guide for the needles as they advance to the tubes, a guiding member or members for aligning the needles when they emerge beyond the tubes, means engageable with any disaligned needle to cause it to clear the tubes when retracting, and means to engage the needles during their retracting movement to maintain the proper curvature thereof.

34. In a machine for threading tuft yarns, the combination with a tube frame adapted rotatably to receive a plurality of spools of ordinary length, a plurality of threading devices, and means periodically and simultaneously to restrain from rotation all of said spools.

35. In a machine for threading tuft yarns, the combination with a tube frame adapted rotatably to receive a plurality of spools of ordinary length, a plurality of threading devices, brake mechanism simultaneously to engage each spool to prevent rotation thereof, and means periodically to release said brake mechanism during the threading operation.

36. In a machine for threading tuft yarns, the combination with a tube frame adapted rotatably to receive a plurality of spools of ordinary length, a plurality of threading devices, means for holding the yarns and engaging them with the needles, brake mechanism engageable with the spools to prevent rotation thereof while the yarns are being withdrawn from said yarn holders, and means subsequently momentarily to release said brake mechanism.

37. In a machine for threading tuft yarns, in combination with a tube frame having means thereon to support a plurality of spools of ordinary length, a support for said frame, a plurality of threading devices, and means for trimming in one operation the threaded yarn ends of all the spools while supported on said tube frame.

38. In a machine for threading tuft yarns, in combination with a tube frame having means thereon to support a plurality of spools of ordinary length, a support for said frame, a plurality of threading devices, and shearing mechanism for the threaded yarn ends including a stationary spring-pressed blade and a cooperating movable blade.

39. In a machine for threading tuft yarns, in combination with a tube frame having means thereon to support a plurality of spools of ordinary length, a support for said frame, a plurality of threading devices, a stationary blade upon said frame support, a movable blade to cooperate therewith, and means for moving said last mentioned blade thereby to trim all the yarn ends in a single operation.

40. In a machine for threading tuft yarns, in combination with a tube frame having means thereon to support a plurality of spools of ordinary length, a support for said frame, a plurality of threading devices, a stationary blade, a cooperating blade movable toward and away from said stationary blade to shear the yarn ends, a support for said movable blade, and means upon said blade support for clamping the yarns during said shearing operation.

41. In a machine for threading tuft yarns, in combination with tube holding means, a plurality of curved threading devices, a pair of cooperating knife blades, and a reciprocable support for one of said blades, said support also carrying a clamp for the yarn ends, and a roll adapted for pressing contact with said threading devices.

42. In a machine for threading tuft yarns through the tubes of a tube frame for use in wide work, the combination of a frame support, a series of curved thread placing devices, means for holding the yarns including a plurality of spools and a corresponding number of comb elements, means for simultaneously engaging all the yarns by the thread placing devices and moving the same through the tubes, and a plurality of guiding elements at all times to maintain the desired alignment and curvature of said thread placing devices.

43. In a machine for threading tuft yarns through the tubes of a tube frame for use in wide work, the combination of a frame support, a series of curved thread placing devices, means for holding the yarns including a plurality of spools and a corresponding number of comb elements, means for simultaneously engaging all the yarns by the thread placing devices and moving the same through the tubes, a plurality of guiding elements at all times to maintain the desired alignment and curvature of said thread placing devices and mechanism for simultaneously shearing all the threaded yarn ends.

44. In a machine for threading tuft yarns through the tubes of a tube frame for use in wide work, the combination of a frame support, a series of curved thread placing devices, means for holding the yarns including a plurality of spools and a corresponding number of comb elements, means for simultaneously engaging all the yarns by the thread placing devices and moving the same through the tubes, a plurality of guiding elements at all times to maintain the desired alignment and curvature of said thread placing devices, and mechanism for simultaneously clamping and shearing all the threaded yarn ends.

45. In a machine for threading tuft yarns through the tubes of a tube frame for use in wide work, the combination of a frame support, a series of curved thread placing devices, means for holding the yarns including a plurality of spools and a corresponding number of comb elements, means for simultaneously engaging all the yarns by the thread placing devices and moving the same through the tubes, a plurality of guiding elements at all times to maintain the desired alignment and curvature of said thread placing devices, and break mechanism periodically to engage and hold all of said spools.

46. In a machine for threading tuft yarns through the tubes of a tube frame for use in wide work, the combination of a frame support, a series of curved thread placing devices, means for holding the yarns including a plurality of spools and a corresponding number of comb elements, means for simultaneously engaging all the yarns by the thread placing devices and moving the same through the tubes, a plurality of guiding elements at all times to maintain the desired alignment and curvature of said thread placing devices, brake mechanism periodically to engage and hold all of said spools, and mechanism for simultaneously clamping and shearing all the threaded yarn ends.

47. Mechanism for tubing tuft yarns in carpet manufacture comprising in combination a tube frame 2 adapted to hold rotatably one or more spools, a support 6 for said frame, a series of yarn threading devices 35, means for holding the yarns in position to be engaged by said devices, and means for moving said devices 35 relatively to the yarns to engage and thread the latter through the tubes of the frame while said spool or spools is or are held on said frame.

48. Mechanism for tubing tuft yarns in carpet manufacture comprising in combination a tube frame 2 adapted to hold rotatably one or more spools, a support 6 for said frame, a series of yarn threading devices 35, means for holding the yarns in position to be engaged by said devices, means for moving said devices 35 relatively to the yarns to engage and thread the latter through the tubes of the frame while said spool or spools is or are held on said frame, and shearing means 110, 111 for trimming the threaded yarn ends.

49. Mechanism for tubing tuft yarns in carpet manufacture comprising in combination a tube frame 2 adapted to hold rotatably one or more spools, a support 6 for said frame, a series of yarn threading devices 35, means for holding the yarns in position to be engaged by said devices, means for moving said devices 35 relatively to the yarns to engage and thread the latter through the tubes of the frame while said spool or spools is or are held on said frame, and means 149 to engage and prevent rotation of said spool or spools upon said frame during a portion of the movement of said devices 35.

50. In a machine for threading tuft yarns, the combination with a tube frame adapted rotatably to support a yarn spool, a series of threading devices having a movement of advance and retraction to engage and place the yarns through the tubes of said frame while the spool is supported thereon, and means to restrain said spool from rotation upon said frame during a portion of the retracting movement of said threading devices.

51. In a machine for threading tuft yarns, the combination with a tube frame adapted rotatably to support a yarn spool, a series of threading devices having a movement of advance and retraction to engage and place the yarns through the tubes of said frame while the spool is supported thereon, and a brake 149 automatically operable at times to engage and prevent said spool from rotating upon the frame.

52. That method of placing tuft yarns through the tubes of a tube frame adapted to hold serially a plurality of spools which consists in positioning and supporting all the yarns of said plurality of spools for placing them through the tubes and with the spools in position upon the frame, and in placing all the yarns each through the proper tube while said spools are so positioned whereby the handling of individual spools after their yarns have been drawn in is obviated.

53. That method of placing tuft yarns through the tubes of a tube frame adapted to support one or more yarn spools which consists in positioning the spool or spools upon the frame, in supporting the yarns of said spool or spools preparatory to being drawn through the tubes and in placing said yarns each through the proper tube while said spool or spools are so positioned directly upon the tube frame.

54. In a machine for tubing tuft yarns in carpet manufacture the combination with a tube frame adapted to support a yarn spool and having a tube for each yarn of said spool, means to position the yarns for the tubing operation, and means to engage and place said yarns each through its proper tube while the spool is supported upon said frame.

55. In a machine for tubing tuft yarns in carpet manufacture the combination with a tube frame adapted to support a yarn spool and having a tube for each yarn of said spool, means to position the yarns for the tubing operation, and a series of threading devices for engaging and placing the yarns through the tubes, said devices being reciprocable through the tubes without contacting said spool in its supported position upon the frame.

56. In a machine for tubing tuft yarns in carpet manufacture the combination with a tube frame adapted to support a yarn spool and having a tube for each yarn of said spool, means to position the yarns for the tubing operation, and a series of reciprocable threading devices to engage and place the yarns through the tubes, said devices being curved so as to pass clear of said spool beyond the tubes.

57. In a machine for tubing tuft yarns in carpet manufacture the combination with a tube frame having a plurality of tubes and adapted to support a yarn spool adjacent the yarn receiving ends of said tubes, means to position the yarns for the tubing operation, and a series of curved threading devices reciprocable along the line of their curvature to engage and place the yarns through the tubes and whereby the yarns of said spool may be tubed while the spool is in its position upon the frame.

In testimony whereof, we have signed our names to this specification.

EDGAR F. HATHAWAY.
WALTER BIXBY.